United States Patent Office 3,703,519
Patented Nov. 21, 1972

3,703,519
PIPERAZINIUM MONO(ACETYLSALICYLATE)
Edward Henderson, 200 Central Park S.,
New York, N.Y. 10019
No Drawing. Filed July 15, 1970, Ser. No. 55,269
Int. Cl. C07d 51/70
U.S. Cl. 260—268 R    1 Claim

ABSTRACT OF THE DISCLOSURE

Piperazinium mono(acetylsalicylate), useful for its analgesic, anti-pyretic, and anti-inflammatory effects, and the method of making it by admixture of ether solutions of acetylsalicylic acid and piperazine.

---

The present invention relates to piperazinium mono(acetylsalicylate) and to a method of making the same.

Acetylsalicylic acid (aspirin) and certain of its salts are known in the art to have a number of uses, the most important of which utilize the favorable analgesic, anti-pyretic, and anti-inflammatory effects of these compounds. However, a well-recognized disadvantage of many of these compounds is their susceptibility to hydrolytic cleavage of the acetyl group in moist air, resulting in the liberation of free acetic acid and free salicylic acid. The latter is highly acid in comparison with aspirin, and the prevention of its formation by decomposition of acetylsalicylic acid or acetylsalicylates is an object much to be desired.

Copending patent application Ser. No. 636.025 filed May 4, 1967 (now U.S. Pat. 3,528,983 granted Sept. 15, 1970) discloses the new salt piperazinium bis(acetylsalicylate) and a method of making the same. This bis salt is exceedingly stable to hydrolysis over a period of years and remtains stable and unhydrolyzed under conditions in which ordinary aspirin hydrolyzes to a considerable degree.

One disadvantage of piperazinium bis(acetylsalicylate) disclosed in said copending application is its slight solubility in water at 25° C. While the solubility of the bis compound increases with the temperature of the water, its slight solubility at room temperature limits its usefulness. In many cases, it would be highly desirable to have a liquid form of aspirin, e.g. as an aqueous solution, particularly for administration to infants and young children and to adults who have difficulty in swallowing a tablet.

According to the present invention, it has been found that piperazinium mono(acetylsalicylate) of the formula

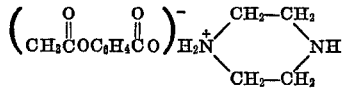

has the beneficial properties of aspirin, is freely soluble in water at room temperature as well as in solvents such as methanol, ethanol, and methylene chloride, and retains the stability to hydrolysis characteristic of the bis salt. [The characterization of the bis salt as slightly soluble in water at room temperature and of the mono salt as freely soluble in water is in accord with the usage of these terms in the United States Pharmacopeia XVI (1960), page 8.]

The mono salt is prepared by the neutralization of one molar part of aspirin, suitably in solution in ethyl ether, with an equivalent quantity, i.e. one molar part, of piperazine dissolved in hot ethyl ether. The use of ether as a medium for the reaction between piperazine and aspirin is unusual, since piperazine is considered to be insoluble in ethyl ether. Indeed, at room temperature this is the case. However, heating to temperatures above room temperature but below the normal boiling point of the ether solubilizes considerable quantities of piperazine, making the above-described process possible.

A better understanding of the present invention and of its many advantages will be had by referring to the following example given by way of illustration.

EXAMPLE 18 grams (0.1 mol) of acetylsalicylic acid dissolved in 450 ml. of ethyl ether were added with stirring to a solution of 8.6 grams (0.1 mol) of piperazine in 450 ml. of hot ether. A white sticky solid separated out. After removal of the ether, the solid was extracted with 250–300 ml. of methanol. On evaporation of the solvent from the methanol extract, 17 grams of a semi-solid product were obtained. Recrystallization from benzene gave analytically pure piperazinium mono(acetylsalicylate). The compound has a melting point of 112–113° C.

The compound is freely soluble in water at room temperature, in methanol, ethanol, and methylene chloride, sparingly soluble in chloroform, and practically insoluble in ether and carbon tetrachloride.

The infrared spectrum of the compound, studied as a Nujol mull, was consistent with the structural assignment.

*Analysis.*—Calculated (percent): C, 58.64; H, 6.81; N, 10.52. Found (percent): C, 58.44: H, 7.01; N, 10.31. Molecular weight: 275.

The mono salt has a lower toxicity than does aspirin U.S.P. when administered in equimolar doses. In albino rats, the oral $LD_{50}$ of aspirin U.S.P. was 1.25 grams per kilo with a plasma salicylate level after 24 hours of 49.7 mg./100 ml. The oral $LD_{50}$ of piperazinium mono(acetylsalicylate) was 2 grams per kilo (corresponding with, or containing, 1.5 gm./kilo of aspirin) with a plasma salicylate level after 24 hours of 59.0 mg./100 ml.

Post-mortem examination of the test animals administered aspirin U.S.P. showed hyperpnea, with some animals having diarrhea, epistaxis, and death following convulsions. The animals killed by aspirin U.S.P. had severe hepatic and renal damage and hemorrhagic gastroenteritis. Autopsy of the dead animals to which piperazinium mono(acetylsalicylate) had been administered showed less gastrointestinal irritation and less kidney damage than was observed in animals administered aspirin U.S.P.

For oral administration in humans, the dosage of the mono salt is the same as, or slightly lower than, for aspirin U.S.P. on an equimolar basis.

What is claimed is:
1. Piperazinium mono(acetylsalicylate).

References Cited

UNITED STATES PATENTS

| | | | |
|---|---|---|---|
| 2,753,350 | 7/1956 | Hasselstrom | 260—268 |
| 2,819,268 | 1/1958 | Baisse et al. | 260—268 |
| 2,842,548 | 7/1958 | Callahan | 260—268 |
| 2,980,681 | 4/1961 | Short et al. | 260—268 |
| 3,019,226 | 1/1962 | Bernstein | 260—268 |
| 3,227,718 | 1/1966 | Johanns et al. | 260—268 |
| 3,349,090 | 10/1967 | Broome et al. | 260—268 |
| 3,522,258 | 7/1970 | Ricciardi et al. | 260—268 |
| 3,528,983 | 9/1970 | Henderson | 260—268 |
| 3,652,644 | 3/1972 | Fareri | 260—268 R |

DONALD G. DAUS, Primary Examiner

U.S. Cl. X.R.

424—230